United States Patent [19]

Nomura et al.

[11] Patent Number: 5,671,134
[45] Date of Patent: Sep. 23, 1997

[54] INVERTER UNIT AND INVERTER APPARATUS

[75] Inventors: Toshihiro Nomura; Kunihiko Karube; Masaaki Hisamoto; Koji Awatani, all of Kanagawa, Japan

[73] Assignee: Fuji Electric Co., Ltd., Kawasaki, Japan

[21] Appl. No.: 523,215

[22] Filed: Sep. 5, 1995

[30] Foreign Application Priority Data

Sep. 13, 1994 [JP] Japan .................................. 6-218448

[51] Int. Cl.$^6$ ............................. H02M 7/538; H02M 1/00
[52] U.S. Cl. ............................................ 363/132; 363/144
[58] Field of Search .................................. 363/132, 141, 363/144, 178

[56] References Cited

U.S. PATENT DOCUMENTS

| | | | |
|---|---|---|---|
| 327,592 | 9/1966 | Fellendorf et al. | 363/141 |
| 2,942,165 | 6/1960 | Jackson et al. | 257/714 |
| 3,320,498 | 5/1967 | Evans | 257/773 |
| 5,130,918 | 7/1992 | Schuster | 363/144 |
| 5,184,291 | 2/1993 | Crowe et al. | 363/132 |

*Primary Examiner*—Stuart N. Hecker
*Attorney, Agent, or Firm*—Kanesaka & Takeuchi

[57] ABSTRACT

An inverter unit of the invention converts a DC current to a high frequency AC current. The inverter unit is formed of a metal conductor base plate connected to a positive terminal of a DC power supply; and switching elements arranged on both surfaces of the base plate. Each switching element situated on each surface of the base plate includes an upper arm and a lower arm of the inverter unit to form an arm pair. The arm pairs formed on both surfaces of the base plate constitute a single phase bridge circuit.

9 Claims, 6 Drawing Sheets

INVERTER UNIT AND INVERTER APPARATUS

BACKGROUND OF THE INVENTION AND RELATED ART STATEMENT

The present invention relates to an inverter unit and an inverter apparatus, in which high electric power is switched by high frequency to convert a DC current to an AC current.

Figure 7:
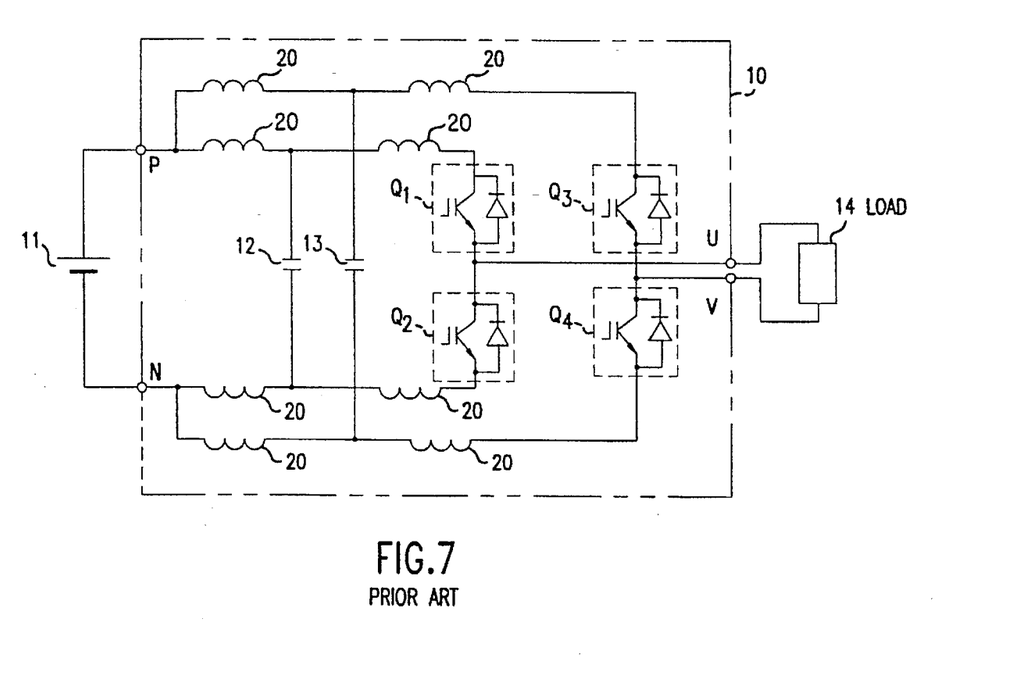
FIG. 7 is a circuit diagram of a conventional inverter unit.

A circuit configuration of a conventional inverter apparatus well known to those skilled in the art is shown in FIG. 7.

Referring now to FIG. 7, an inverter apparatus 10 has a DC power supply 11, a high frequency capacitor 12 with low impedance, and a series circuit of an upper arm switching element Q1 and a lower arm switching element Q2. The series circuit and the high frequency capacitor 12 are connected in parallel between PN terminals of the DC power supply 11. The inverter apparatus 10 also has another parallel connection between the PN terminals, which is formed of a capacitor 13 and a series circuit of an upper arm switching element Q3 and a lower arm switching element Q4. A common connection point of the switching elements Q1 and Q2 is connected with a terminal U of a load 14, and a common connection point of the switching elements Q3 and Q4 is connected with a terminal V of the load 14. The inverter apparatus 10 switches on and off the switching elements Q1, Q2, Q3 and Q4 in a predetermined order to supply high frequency electric power to the load 14.

Though not shown in FIG. 7, a plurality of semiconductor elements is connected in parallel to constitute each switching element Q1, Q2, Q3 or Q4. Though various kinds of semiconductor elements may be used, the switching elements formed of an insulated gate bipolar transistor (IGBT) and a diode connected in reverse parallel are exemplary shown in FIG. 7.

However, each arm of the above described inverter apparatus has leakage reactance 20 as shown in FIG. 7. The leakage reactance 20 causes an over voltage across the switching elements, and switching loss increase.

When the switching elements of each arm are arranged on a plane, connection parts and insulation parts increase to further cause increase of heat radiation resistance of the switching elements insulated by insulating materials. Increase of heat radiation resistance lowers the allowable output of the inverter apparatus.

In Japanese Patent Publication (KOKAI) No. 1-238469, an inverter includes two switching elements disposed on a heat radiating plate and connected in series by a conductor with a step. The above inverter operates properly, but the inverter is not still fully effective in space and cooling point of views.

In view of the foregoing, it is an object of the present invention to provide an inverter unit and inverter apparatus which solve the above described problems.

SUMMARY OF THE INVENTION

According to a first aspect of the present invention, there is provided an inverter unit that converts a DC current to a high frequency AC current comprising: a metal conductor base plate connected to a positive terminal of a DC power supply; and switching elements arranged on both surfaces of the base plate. The switching elements arranged on each surface of the base plate constitute a pair of an upper arm and a lower arm connected in series (hereinafter referred to as "arm pair"), and both arm pairs formed on both surfaces of the base plate constitute a single phase bridge circuit.

According to a second aspect of the present invention, in the first aspect, the arm pair of the inverter unit formed on one of the surfaces of the metal conductor base plate comprises a first thin metal conductor connected to a negative terminal of the DC power supply; a second thin metal conductor having a step dividing the second conductor to a first part contacting with the first conductor through an electric insulator and a second part contacting with the base plate through an electric insulator; and the switching elements connected in the arm pair of the inverter unit, which comprise a first flat semiconductor element sandwiched between the second conductor and the base plate, and a second flat semiconductor element sandwiched between the second conductor and the first conductor. The first and second flat semiconductor elements are connected in series through the second conductor to form a series circuit, and the series circuit is connected between the base plate and the first conductor. The base plate, the first and second conductors, and the first and second semiconductor elements are pressed at the connecting faces.

In a third aspect of the invention, the metal conductor base plate in the first and second aspects preferably includes holes through which a coolant flows for cooling the base plate.

According to a fourth aspect of the present invention, in the first aspect, the metal conductor base plate includes holes through which a coolant flows for cooling the base plate, and the arm pair of the inverter unit formed on one of the surfaces of the base plate comprises a first thin metal conductor connected to a negative terminal of the DC power supply; a second thin metal conductor having a step dividing the second conductor to a first part contacting with the first conductor through an electric insulator and a second part contacting with the base plate through an electric insulator; a thick conductor plate located between the second conductor and the first conductor and having holes through which a coolant flows for cooling the thick conductor plate; and the switching elements connected in the arm pair of the inverter unit, which comprise a first flat semiconductor element sandwiched between the second conductor and the base plate, and a second flat semiconductor element sandwiched between the thick conductor plate and the first conductor. The first and second flat semiconductor elements are connected in series through the second conductor to form a series circuit, and the series circuit is connected between the base plate and the first conductor. The base plate, the first and second conductors, the first flat semiconductor element, the thick base plate and the second conductor are pressed at the connecting faces.

According to a fifth aspect of the present invention, there is provided an inverter apparatus comprising: a plurality of inverter units for converting a DC current to a high frequency AC current; a case for mounting therein the inverter units; a plurality of pairs of opposed guide rails, each pair holding one inverter unit therebetween; and a bus laminate formed of a plurality of conductors insulated by insulators. When the inverter units are mounted, the bus laminate is connected with the inverter units behind the case.

According to a sixth aspect of the invention, in the fifth aspect, the inverter unit comprises a metal conductor base plate connected to a positive terminal of a DC power supply; and switching elements arranged on both surfaces of the base plate. The switching elements arranged on one of the surfaces of the base plate constitute a pair of an upper arm and a lower arm of the inverter unit, and both arm pairs formed on both surfaces of the base plate constitute a single phase bridge circuit.

According to a seventh aspect of the invention, in the sixth aspect, the edges of the inverter unit are made parallel to each other and are held between a pair of the guide rails.

According to the inverter unit or inverter apparatus of the invention, the arm pair formed of the flat semiconductor elements connected in series through the second conductor with the step is press-fixed to the metal conductor base plate and the first thin metal conductor, which are connected to the DC power supply. This structure facilitates construction of a single phase bridge circuit having small leakage reactance. As a result, very stable switching characteristics are obtained in switching high power at a high frequency to convert a DC current to an AC current. By providing the metal conductor base plate with the holes through which a coolant flows and by further providing the thick conductor plate having holes through which a coolant flows, cooling of the flat semiconductor elements is improved, and the allowable output of the inverter unit is increased.

Also, in the inverter apparatus of the invention, a plurality of the inverter units is inserted easily through the guide rails into the case. By connecting the inserted inverter units with the bus laminate on the back side of the case, the output capacity is further increased and the leakage reactance on the AC output side is reduced.

DETAILED DESCRIPTION OF THE PREFERRED EMBODIMENTS

Hereinafter, the present invention will be explained with reference to the accompanied drawings which illustrate preferred embodiments of the invention.

Figure 1:
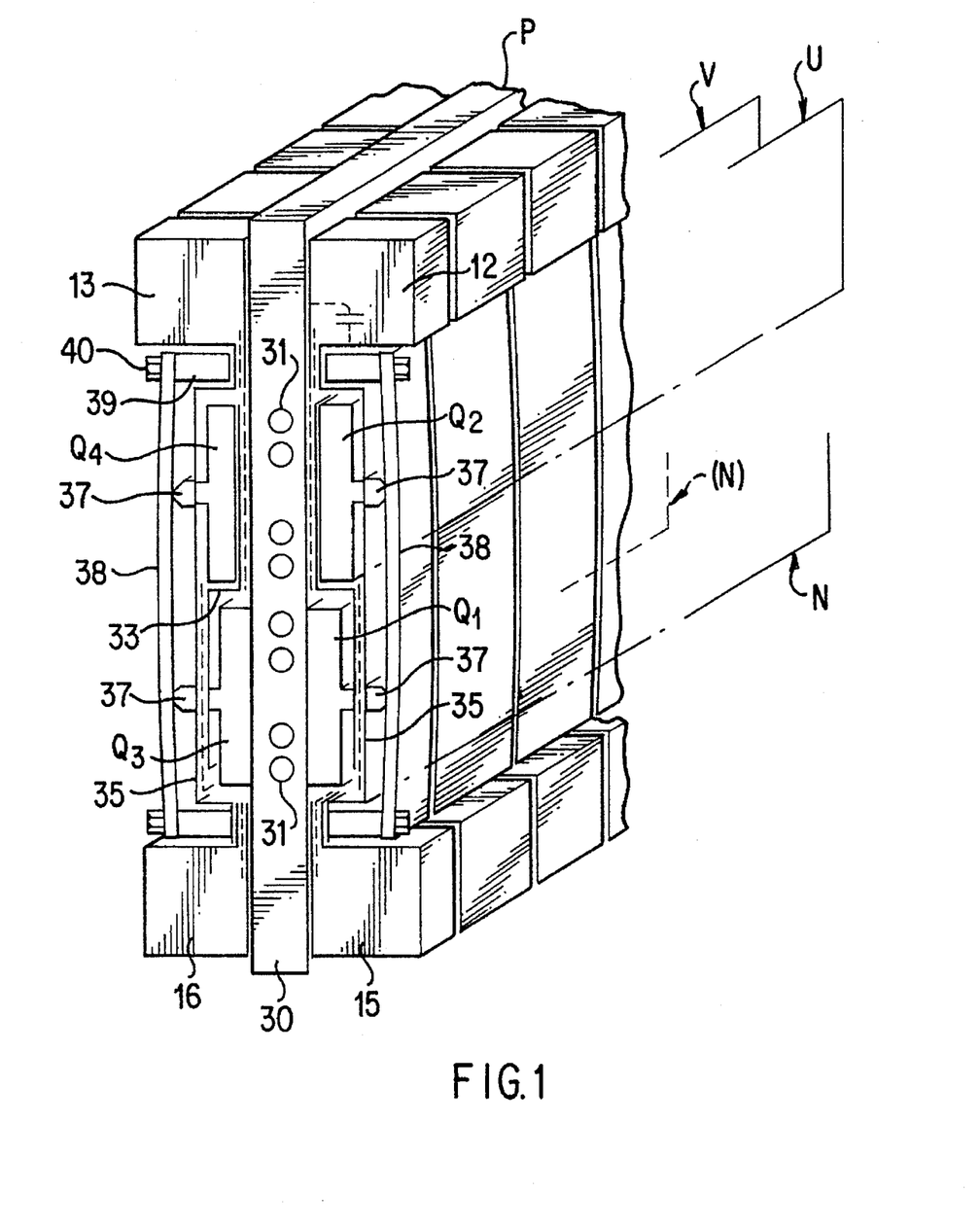
FIG. 1 is a perspective view of a first embodiment of an inverter unit of the present invention.
Figure 2:
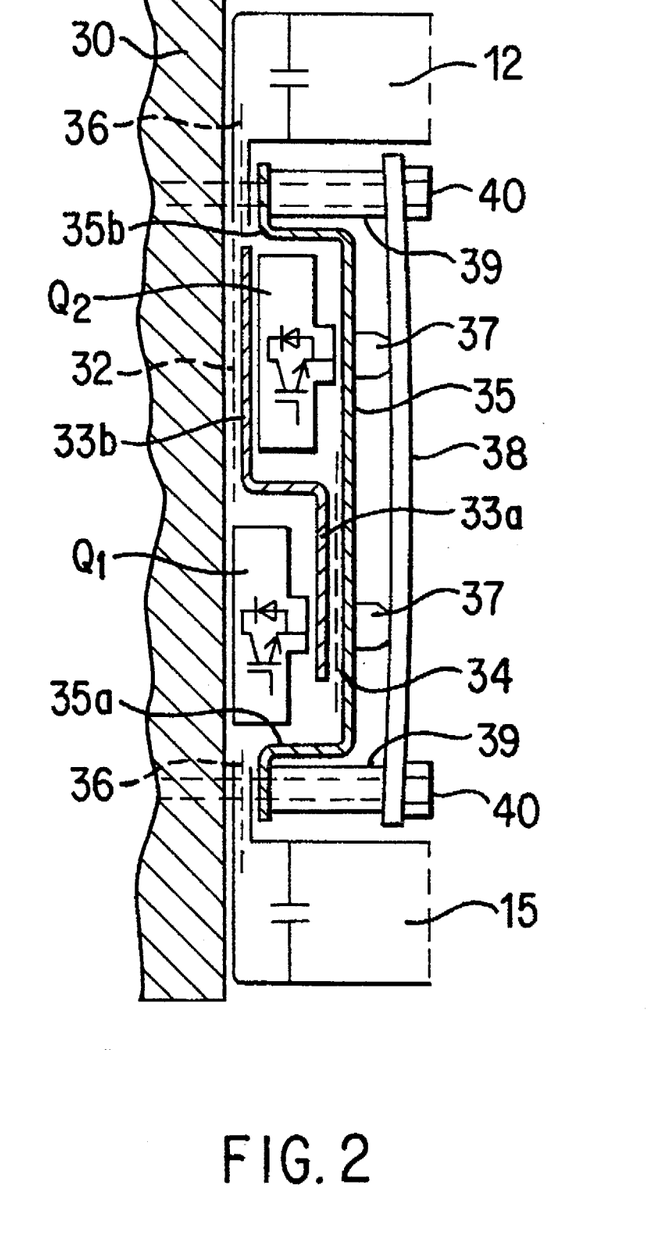
FIG. 2 is an enlarged explanatory section view of the inverter unit of FIG. 1.

FIG. 1 is a perspective view of a first embodiment of an inverter unit of the present invention, and FIG. 2 is a cross section of the inverter unit of FIG. 1.

Referring now to FIGS. 1 and 2, numeral 30 designates a metal conductor base plate 30. The metal conductor base plate 30 is provided, at a portion where semiconductor elements are arranged, with holes 31 through which a coolant for cooling the metal conductor base plate 30 flows. The metal conductor base plate 30 is connected with a positive terminal P of a power supply 11. Switching elements Q1, Q3 including IGBTs and etc. are arranged at the lower parts of the front and rear surfaces of the metal conductor base plate 30. Electric insulators or insulating materials 32 showing excellent thermal conductivity are arranged at the upper part of the front and rear surfaces of the metal conductor base plate 30.

Thin metal conductors 33, each having a step in its lateral cross section, are disposed with the lower parts 33a contacting with the upper surfaces of the switching elements Q1 and Q3 and with the upper parts 33b contacting with the insulators 32, respectively. Electric insulators 34 are disposed on the lower parts 33a of the thin metal conductors 33, and switching elements Q2, Q4 are arranged on the upper parts 33b of the thin metal conductors 33. The switching elements Q2, Q4 and the insulators 34 are covered with thin metal conductors 35, respectively. Thin metal conductors 35 are connected with a negative terminal N of the power supply 11.

Thus, the semiconductor switching elements Q1 and Q3 arranged in parallel and contacting directly with the lower part of the metal conductor base plate 30 are connected through the respective thin metal conductors 33 in series with the semiconductor switching elements Q2 and Q4 arranged in parallel and contacting directly with the thin metal conductors 35 constituting the negative terminal N.

Upper and lower portions 35a and 35b of the conductor 35 are bent inward, and the bent portions 35a and 35b of the conductor 35 are further bent and extended vertically. The extended parts of the portions 35a and 35b of the conductor 35 are fixed through electric insulators 36 to the metal conductor base plate 30 constituting the positive terminal P. Both terminals of the respective capacitors 12 13, 15, 16 are sandwiched through the insulator 36 between the base plate 30 and the portions 35a or 35b of the conductor 35.

Plate springs 38 are disposed through cushions 37 positioned on the portions of the conductors 35 corresponding to the switching elements Q1, Q2, and Q3, Q4. Both side portions of each plate spring 38 are connected to the base plate 30 together with the conductor 35 by screws 40 through spacers 39 disposed on the portions 35a, 35b.

Thus, the switching elements Q1, Q2 and Q3, Q4 are pressed by and contacted with the base plate 30 and the metal conductor 35. The pressure is exerted to all the switching elements, and all the constituents are tightly fixed electrically, thermally and/or mechanically.

Figure 3:
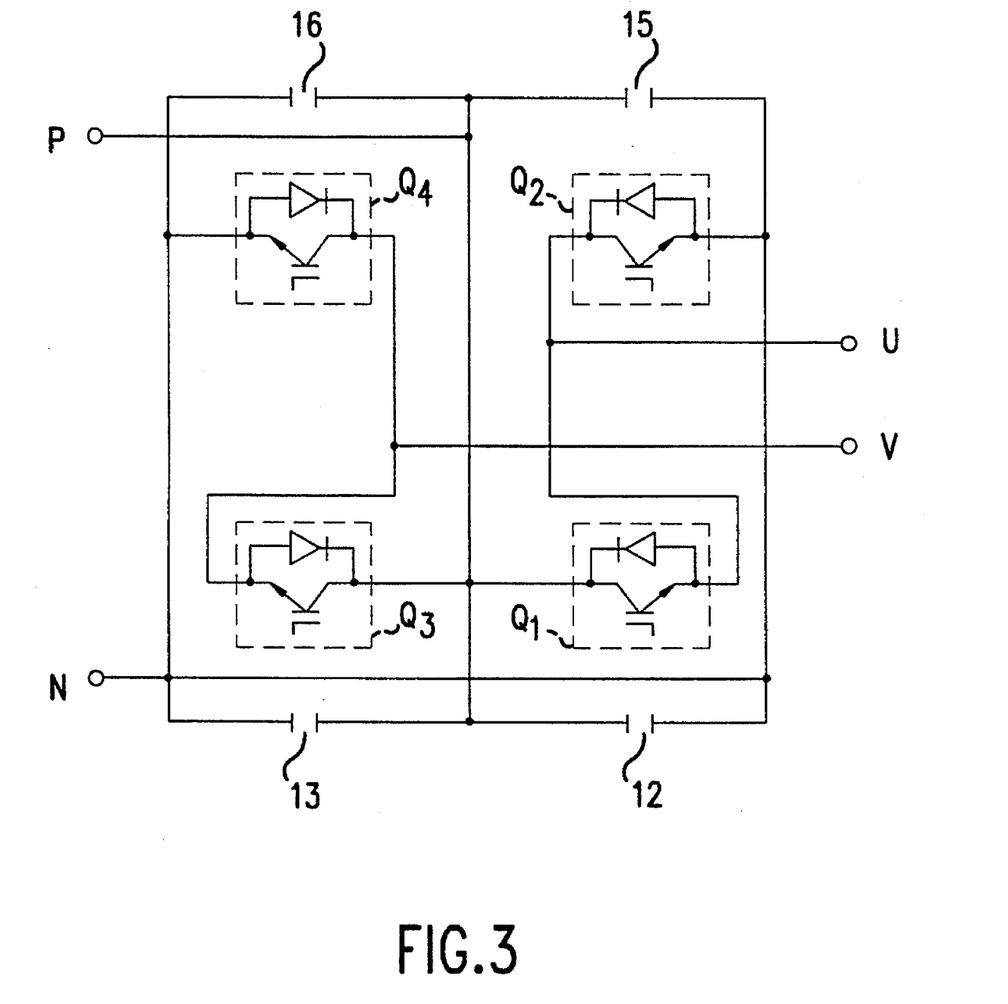
FIG. 3 is a circuit diagram of the inverter unit of FIGS. 1 and 2.

Referring now to FIG. 3 showing a circuit diagram of the inverter of FIGS. 1 and 2, output terminals U and V of a single phase bridge circuit are led out from the thin metal conductors 33, respectively.

Figure 4:
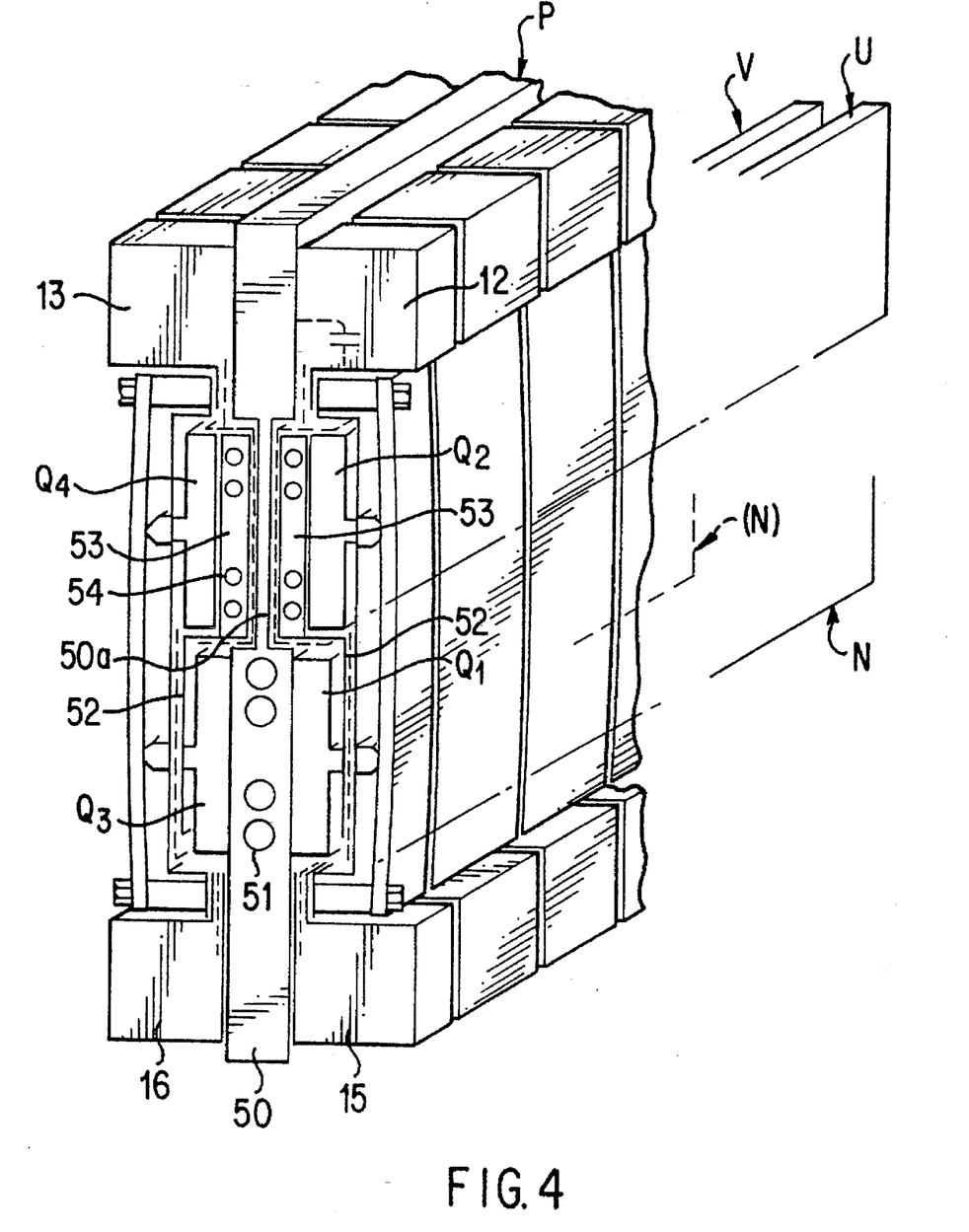
FIG. 4 is a perspective view of a second embodiment of an inverter unit of the present invention.

FIG. 4 is a perspective view of a second embodiment of an inverter unit of the present invention. Referring to FIG. 4, a metal conductor base plate 50 has holes, through which a coolant flows, near portions where the semiconductor switching elements are located. Recesses 50a are disposed on both faces of the base plate 50. Thin metal conductors 52 led out to the terminals U, V are placed in the bottoms of the recesses 50a. And, thick conductor plates 53 having holes 54 through which a coolant flows are sandwiched respectively between the thin metal conductor 52 and the semiconductor switching element Q2 or Q4 so as to improve cooling efficiency of the switching elements Q2, Q4. In the other structural aspects, the second embodiment is the same as the first embodiment shown in FIGS. 1 and 2.

Figure 5:
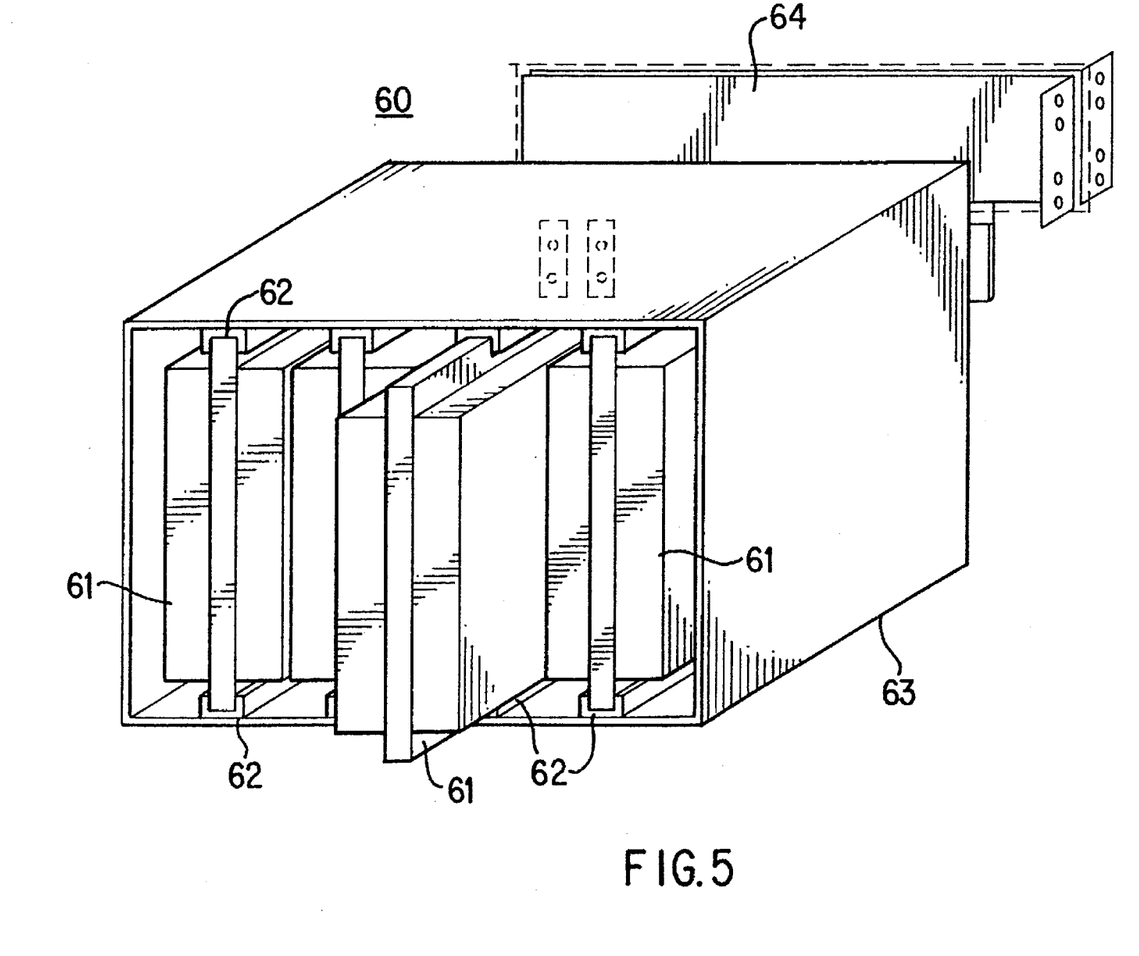
FIG. 5 is a perspective view of an embodiment of an inverter apparatus of the present invention.

FIG. 5 shows a perspective view of a third embodiment of an inverter apparatus of the present invention. In FIG. 5, an inverter apparatus 60 of the invention has a plurality of inverter units 61, a plurality of pairs of guide rails 62 for holding the inverter units 61, a case 63 having the guide rails 62 on the upper and lower inner surfaces thereof, and a bus laminate 64 having a plurality of conductors laminated through electric insulator films. The inverter units 61 are inserted into the case 63 along the rails 62, and connected with the bus laminate 64 on the back surface of the case 63.

Figure 6:
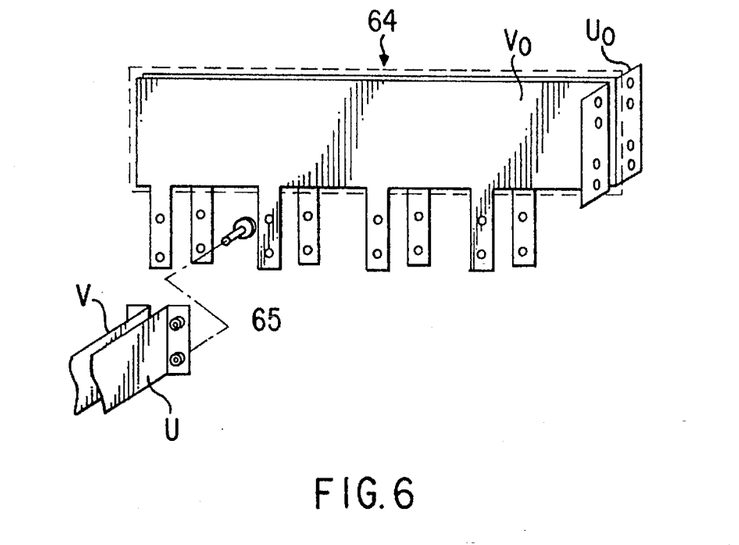
FIG. 6 is a diagram of a part of the inverter apparatus of FIG. 5.

The inverter unit 61 is required to have the opposed side faces of the metal base plate 30 or 50 of the inverter unit of FIG. 1 or 4 parallel to each other so that the inverter unit may be held between the rails 62. Also, the output terminals U and V are required to be lead from the thin metal conductors 33, 52 so that the output terminals U and V may be connected with the bus laminate 64 with screws 65 as shown in FIG. 6. The inverter units of FIGS. 1 and 4 are easily constructed so as to meet the requirements described above.

Since the constituent elements of the inverter unit including semiconductor switching elements etc. are electrically connected with conductors having a predetermined width according to the present invention, the leakage reactance between the adjacent semiconductor switching elements connected in parallel as well as the leakage reactance among the semiconductor switching elements constituting the single phase bridge circuit are reduced to the minimum.

According to the invention, leakage inductance corresponding to the above described leakage reactance is reduced to several nH, and a preferable single phase bridge circuit that outputs a high frequency output of several kHz is obtained easily. Since a current of several hundreds amperes can flow through a pair of flat semiconductor elements, the output power from several tens to several hundreds kW may be obtained easily by connecting 5 to 6 pairs of the flat semiconductor elements in parallel as the semiconductor switching elements.

In the inverter apparatus of the invention, 2 to 10 inverter units may be operated in parallel. Since the leakage inductance of the bus laminate can be suppressed below several nH according to the invention, it is possible to form an inverter apparatus from a hundred to several thousands kW.

What is claimed is:

1. An inverter unit for converting a DC current to a high frequency AC current comprising:

a metal conductor base plate connected to a positive terminal of a DC power supply; and two arm pairs arranged on both surfaces of the base plate for constituting a single phase bridge circuit, each arm pair being situated on each surface of the base plate and including an upper arm, a lower arm, two switching elements, and one conductor for connecting the two switching elements together in series, one of the switching elements being directly connected to the base plate and the other of the switching elements contacting the base plate through an electric insulator and being connected to a negative terminal of the DC power supply.

2. An inverter unit as claimed in claim 1, wherein each arm pair of the inverter unit formed on one of the surfaces of the metal conductor base plate further comprises:

a first thin metal conductor connected to the negative terminal of the DC power supply;

said one conductor being a second thin metal conductor having a step dividing the second conductor to a first part contacting with the first conductor through an electric insulator and a second part contacting with the base plate through the electric insulator for the other switching element, and said two switching elements being formed of first and second flat semiconductor elements, said first flat semiconductor element being the one switching element and sandwiched between the first part of the second conductor and the base plate, and said second flat semiconductor element being the other switching element and sandwiched between the second part of the second conductor and the first conductor so that the first and second flat semiconductor elements are connected in series through the second conductor, which are disposed between the base plate and the first metal conductor, and contacting faces of the base plate, the first and second conductors and the first and second flat semiconductor elements are pressed.

3. An inverter unit as claimed in claim 2, further comprising a plate spring connected to the base plate, said each arm pair being disposed between the plate spring and the base plate so that the contacting faces are pressed together.

4. An inverter unit as claimed in claim 1, wherein said metal conductor base plate includes holes therein to allow a coolant to flow therethrough to cool the base plate.

5. An inverter unit as claimed in claim 1, wherein said metal conductor base plate includes holes therein to allow a coolant to flow therethrough to cool the base plate, and each arm pair of the inverter unit formed on one of the surfaces of the metal conductor base plate further comprises:

a first thin metal conductor connected to the negative terminal of the DC power supply, and a thick conductor plate having holes to allow a coolant to flow therethrough, said one conductor being a second thin metal conductor having a step dividing the second conductor to a first part contacting with the first conductor through an electric insulator and a second part contacting with the base plate through the electric insulator for the other switching element, said one switching element being a first flat semiconductor element sandwiched between the first part of the second conductor and the base plate, said other switching element being a second flat semiconductor element, and said thick conductor plate and the second flat semiconductor element being sandwiched between the second part of the second conductor and the first conductor so that the first and second flat semiconductor elements are connected in series through the second conductor, which are disposed between the base plate and the first metal conductor, and contacting faces of the base plate, the first and second conductors, the first and second flat semiconductor elements and the thick conductor plate are pressed.

6. An inverter unit as claimed in claim 1, further comprising two pairs of capacitors, each pair of capacitors being fixed on one side of the base plate to interpose the arm pair therebetween and electrically connected together through a first conductor.

7. An inverter apparatus comprising:

a plurality of inverter units for converting a DC current to a high frequency AC current, each inverter unit comprising a metal conductor base plate connected to a positive terminal of a DC power supply and having a pair of opposed ends parallel to one another; and two arm pairs arranged on both surfaces of the base plate for constituting a single phase bridge circuit, each arm pair being situated on each surface of the base plate and including an upper arm, a lower arm, two switching elements, and one conductor for connecting the two switching element together in series, one of the switching elements being directly connected to the base plate and the other of the switching elements contacting the base plate through an electric insulator and being connected to a negative terminal of the DC power supply;

a case for mounting therein the inverter units;

a plurality of pairs of opposed guide rails for holding the inverter units between the respective pairs of the guide rails, said metal conductor base plate being held between a pair of the guide rails through the parallel ends; and a bus laminate having a plurality of conductors and an insulator Situated between two of the conductors for insulating the conductors, said bus laminate being connected with the inverter units when the inverter units are mounted in the case.

8. An inverter unit for converting a DC current to a high frequency AC current comprising:

a metal conductor base plate adapted to be connected to a positive terminal of a DC power supply; and switching elements arranged on both surfaces of the base plate, each switching element situated on each surface of the base plate including an upper arm and a lower arm of the inverter unit to form an arm pair, said arm pairs formed on both surfaces of the base plate constituting a single phase bridge circuit, each arm pair of the inverter unit formed on one of the surfaces of the metal conductor base plate comprising:

a first thin metal conductor adapted to be connected to a negative terminal of the DC power supply;

a second thin metal conductor having a step dividing the second conductor to a first part contacting with the first conductor through an electric insulator and a second part contacting with the base plate through an electric insulator, and first and second flat semiconductor elements, said first flat semiconductor element being sandwiched between the first part of the second conductor and the base plate, and said second flat semiconductor element being sandwiched between the second part of the second conductor and the first conductor so that the first and second flat semiconductor elements are connected in series through the second conductor, which are disposed between the base plate and the first metal conductor, and contacting faces of the base plate, the first and second conductors and the first and second flat semiconductor elements are pressed.

9. An inverter unit for converting a DC current to a high frequency AC current comprising:

a metal conductor base plate adapted to be connected to a positive terminal of a DC power supply and having holes therein to allow a coolant to flow therethrough to cool the base plate; and switching elements arranged on both surfaces of the base plate, each switching element situated on each surface of the base plate including an upper arm and a lower arm of the inverter unit to form an arm pair, said arm pairs formed on both surfaces of the base plate constituting a single phase bridge circuit, each arm pair of the inverter unit formed on one of the surfaces of the metal conductor base plate comprising:

a first thin metal conductor adapted to be connected to a negative terminal of the DC power supply, a second thin metal conductor having a step dividing the second conductor to a first part contacting with the first conductor through an electric insulator and a second part contacting with the base plate through an electric insulator, a first flat semiconductor element sandwiched between the first part of the second conductor and the base plate, a second flat semiconductor element, and a thick conductor plate having holes to allow a coolant to flow therethrough, said thick conductor plate and the second flat semiconductor element being sandwiched between the second part of the second conductor and the first conductor so that the first and Second flat semiconductor elements are connected in series through the second conductor, which are disposed between the base plate and the first metal conductor, and contacting faces of the base plate, the first and second conductors, the first and second flat semiconductor elements and the thick conductor plate are pressed.

\* \* \* \* \*

UNITED STATES PATENT AND TRADEMARK OFFICE
CERTIFICATE OF CORRECTION

PATENT NO.  : 5,671,134
DATED       : September 23, 1997
INVENTOR(S) : Toshihiro Nomura; Kunihiko Karube; Masaaki Hisamoto; Koji Awatani It is certified that error appears in the above-indentified patent and that said Letters Patent is hereby corrected as shown below:

In column 3, line 54, delete "30";

In column 5, line 3, change "lead" to --led--;

In column 6, line 61, change "element" to --elements--;

In column 7, line 7, change "Situated" to --situated--; and

In column 8, line 31, change "Second" to --second--.

Signed and Sealed this

Twenty-fifth Day of May, 1999

Attest:

Q. TODD DICKINSON

*Attesting Officer*  *Acting Commissioner of Patents and Trademarks*